FIG. 1

INVENTORS
VAN B. GARRISON
ARTHUR W. GRUBER
JOSEPH F. KIERNAN
BY H. Hume Mathews
ATTORNEY

INVENTORS
VAN B. GARRISON
ARTHUR W. GRUBER
JOSEPH F. KIERNAN
BY
ATTORNEY

Nov. 5, 1957　　V. B. GARRISON ET AL　　2,812,174
SCARFING METHOD AND APPARATUS
Filed Oct. 19, 1953　　　　　　　　　　9 Sheets-Sheet 5

INVENTORS
VAN B. GARRISON
ARTHUR W. GRUBER
JOSEPH F. KIERNAN
BY
ATTORNEY

Nov. 5, 1957  V. B. GARRISON ET AL  2,812,174
SCARFING METHOD AND APPARATUS
Filed Oct. 19, 1953  9 Sheets-Sheet 6
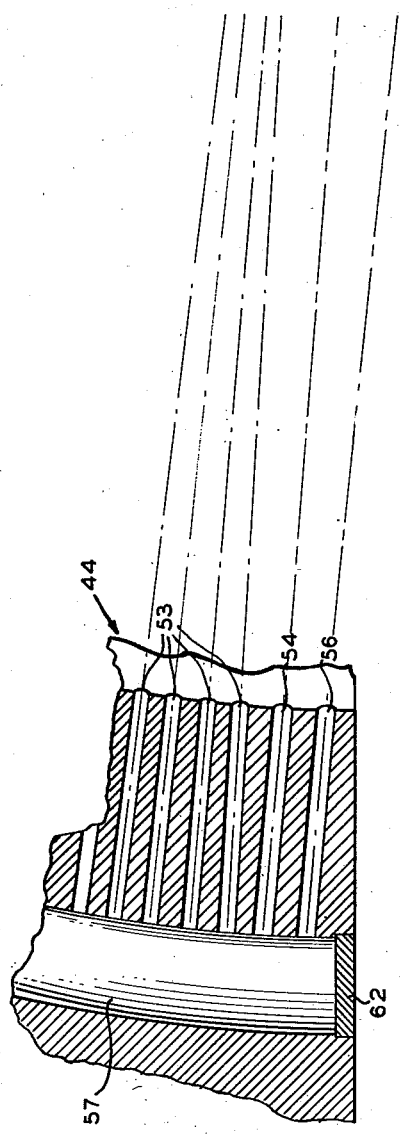
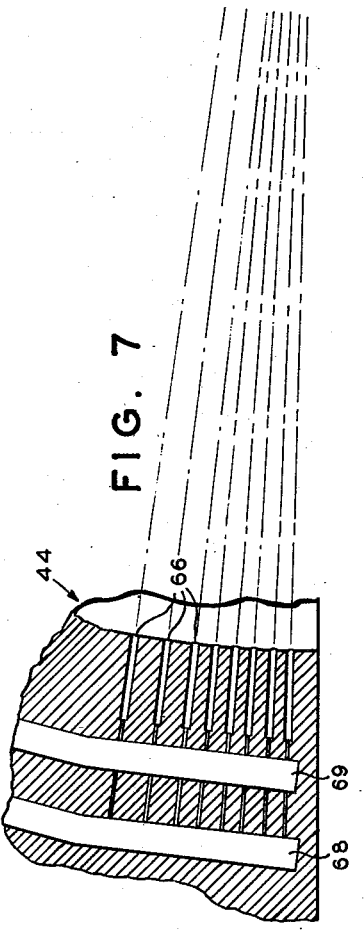
INVENTORS
VAN B. GARRISON
ARTHUR W. GRUBER
JOSEPH F. KIERNAN
BY
ATTORNEY Nov. 5, 1957  V. B. GARRISON ET AL  2,812,174
SCARFING METHOD AND APPARATUS
Filed Oct. 19, 1953  9 Sheets-Sheet 7

INVENTORS
VAN B. GARRISON
ARTHUR W. GRUBER
JOSEPH F. KIERNAN
BY
ATTORNEY

Nov. 5, 1957  V. B. GARRISON ET AL  2,812,174
SCARFING METHOD AND APPARATUS

Filed Oct. 19, 1953  9 Sheets-Sheet 8

INVENTORS
VAN B. GARRISON
ARTHUR W. GRUBER
JOSEPH F. KIERNAN
BY *K. Hume Mathews*
ATTORNEY Nov. 5, 1957　　V. B. GARRISON ET AL　　2,812,174
SCARFING METHOD AND APPARATUS
Filed Oct. 19, 1953　　9 Sheets—Sheet 9

INVENTORS
VAN B. GARRISON
ARTHUR W. GRUBER
JOSEPH F. KIERNAN
BY
ATTORNEY

United States Patent Office 2,812,174
Patented Nov. 5, 1957

2,812,174

SCARFING METHOD AND APPARATUS

Van Buskirk Garrison, Caldwell, Arthur W. Gruber, Union City, and Joseph F. Kiernan, Dunellen, N. J., assignors to Air Reduction Company, Incorporated, New York, N. Y., a corporation of New York Application October 19, 1953, Serial No. 386,792

7 Claims. (Cl. 266—23)

This invention relates to methods and apparatus for thermochemically desurfacing or scarfing cylindrical metal workpieces and more particularly it relates to scarfing round billets in a rolling mill roll line.

Many successful installations have been made in recent years for scarfing workpieces of rectangular cross section. These machines have been developed to satisfactorily scarf billets, blooms, and slabs one or two surfaces at a time or all four surfaces simultaneously. Such machines have also been adapted to the scarfing of workpieces of various sizes by relatively simple adjustments of the machine. Machines for scarfing rectangular workpieces usually are adapted to assume an operable position with respect to the workpieces regardless of the position of the workpiece on the roll table. An inherent advantage which simplifies the design of a scarfing machine for workpieces having flat surfaces is the fact that a single burner scarfs an entire face of the workpiece, and the point at which adjacent burners meet is the corner of the workpiece.

The satisfactory design of suitable apparatus for scarfing rounds is considerably more difficult and up to the time of the present invention, the longitudinal scarfing of rounds has been considered entirely impractical for several reasons. In the past, to avoid these difficulties, it has been proposed to scarf rounds in much the same manner as a layer of metal is removed from the surface of a round workpiece in a lathe. The scarfing oxygen jets were obliquely directed toward the surface of the work in a direction perpendicular to a line drawn on the surface of the work parallel to the longitudinal axis. This has obvious disadvantages in the requirements for positioning the workpiece and the requirement for rotating it simultaneously with advancing it longitudinally.

There are three principle difficulties involved in the design of a machine for longitudinally scarfing rounds which have been overcome by the present invention. First, since it is necessary to make the scarfing burner automatically adjust itself to the position of the workpiece on the roll table and simultaneously to eliminate, to a large degree, the possibility of the billet accidentally crashing into the burner, it has been found necessary to make the burner in at least two segments so that it can be opened and removed from the roll table as the billet comes into the scarfing area and can then be closed on the billet to completely surround it for a single pass longitudinal scarfing operation. A second difficulty resides in the practical necessity of designing a single scarfing head capable of longitudinally scarfing a range of sizes (diameter) of round billets, particularly where the resulting scarfed surface must be smooth and free of ridges. A third difficulty in the design of the equipment of the type here in question, is the technical problem of designing the burner head so that it may realistically and economically be manufactured. The fact that a great many drilled passages are required and that these passages are not parallel greatly complicates the machining operations involved in the manufacturing of such a head.

It is an object, therefore, of the present invention to provide a method and apparatus for the longitudinal scarfing of cylindrical workpieces in which the burner is a multi-piece burner capable of being opened to permit the entrance and exit of workpiece from the scarfing area and which can be closed around the workpiece to permit continuous single pass scarfing of the entire workpiece surface.

Another object of this invention is to provide a method and apparatus for producing scarfed surfaces free from ridges on a range of diameters of cylindrical workpieces.

Another object of this invention is to provide apparatus for longitudinally scarfing round workpieces that is relatively simple to make and requires little maintenance.

Figure 1 illustrates a front view of a scarfing machine according to the present invention for the longitudinal scarfing of round billets.

Figure 7 is a sectional partial view showing the preheat ports at the end of a segment.

Figure 8 is a sectional partial view showing the scarfing oxygen orifices at the end of a segment.

Figure 4:
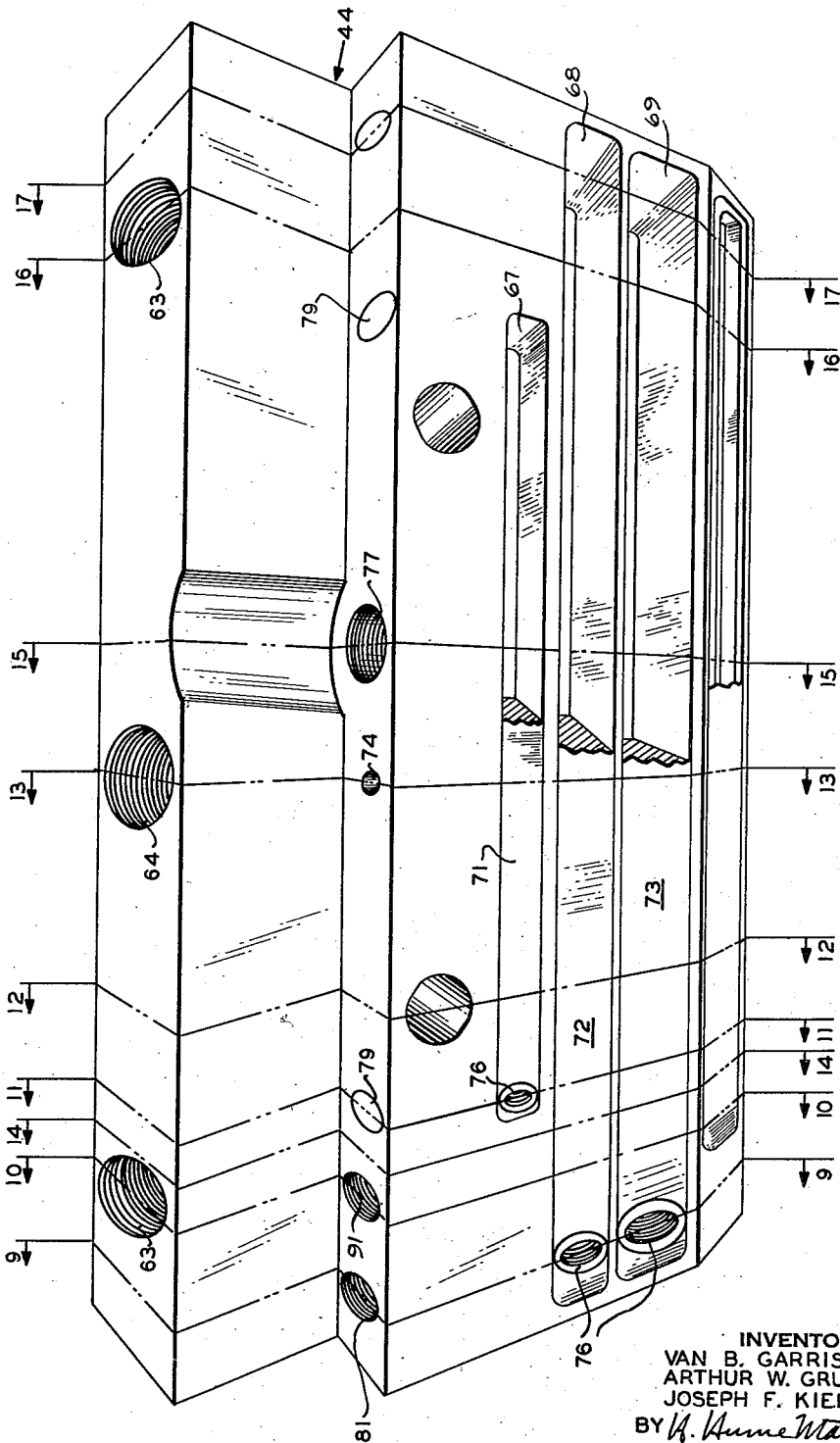
Figure 4 is a view of the quarter round segment of Figure 3 taken from the side opposite to that shown in Fig. 3.

Figures 9 thru 17 are sectional views taken along lines 9—9 thru 17—17 of Figure 4.

Figure 2:
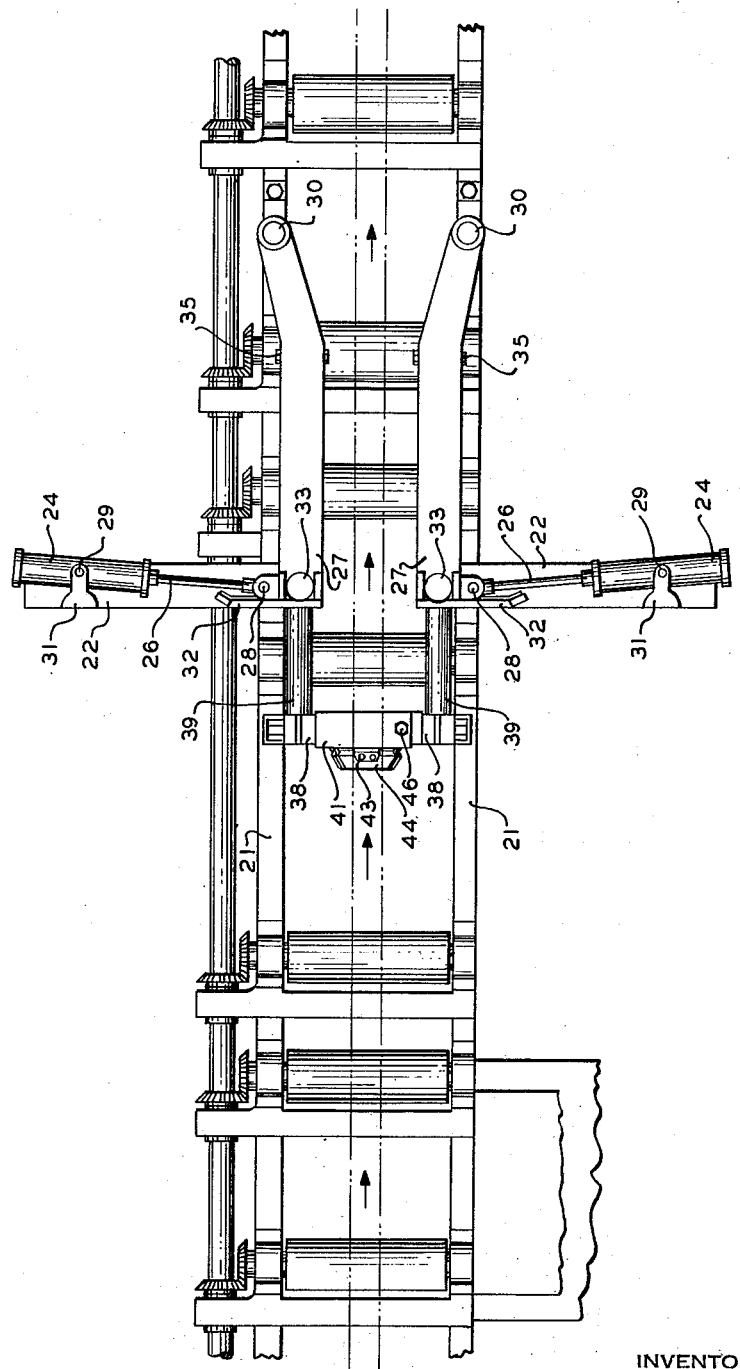
Figure 2 is a top view of the scarfing installation of Figure 1.
Figure 3:
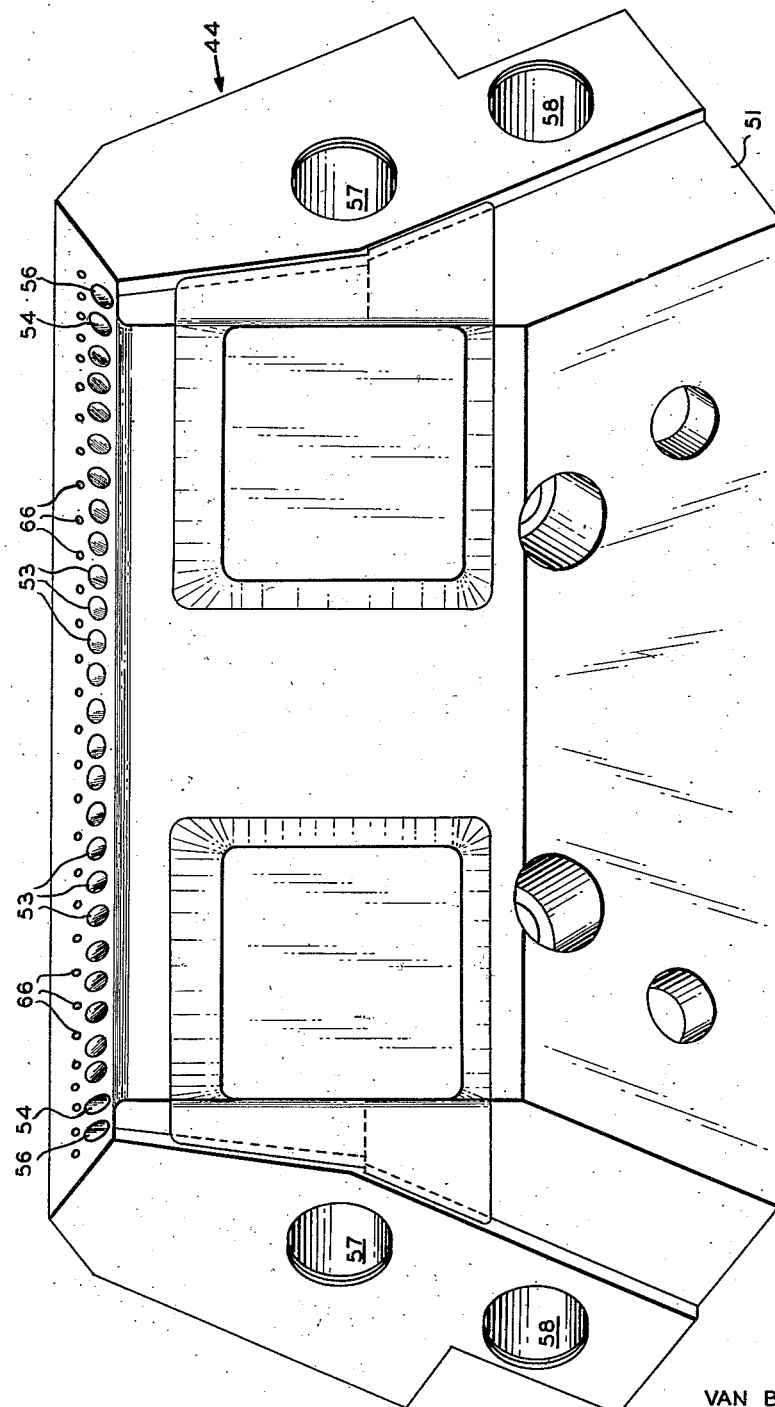
Figure 3 is a view from the side against the billet of a quarter round segment of a round scarfing head and wear shoe according to the present invention.

A simple form of scarfing machine embodying the present invention is shown in Figures 1 and 2.

A fixed frame 21, which is the frame of a rolling mill roll table, acts as an interior end support for cross beams 22 which are supported at their outer ends by legs 23. Cylinder-and-piston motors 24, preferably of the pneumatic type, have piston rods 26 connected with support frames 27 by pivot connections 28. The cylinders of motors 24 have trunnions 29 that support the motors from brackets 31 bolted to the cross beams 22 which are in effect a part of the stationary or fixed frame 21 of the conveyor. The aforementioned support frames 27 are mounted on wheeled carriages 32 which can be advanced or retracted by the motion transmitted to the piston rods 26 through the cylinder-and-piston motors 24. The support frames 27 include upwardly extending members supporting cylinder-and-piston motors 33. Trunnions 34 act in such a manner as to pivotally support the cylinder-and-piston motors 33 in a relatively fixed position. The motors 33 have piston rods 36 connected by pivot pins 37 to clamps 38 that grip the tubular portion of extending arms 39. These arms are pivotally joined to support frame 27 by a pivot pin 35 for vertical movement as best shown in Figure 2. Support frame 27 is pivoted to the roll table main frame at 30 for horizontal movement. The scarfing head supports 41 and 42 respectively are secured to arms 39. The scarfing head brackets 43 are secured in turn to the scarfing head supports 41 and 42 and the scarfing burner segments 44 are secured to the brackets 43. The fluid motors described provide for advancing and retracting the scarfing head segments toward and away from the center of the roll table as well as raising and lowering them. These positioning operations may be performed separately or simultaneously.

The torch elements, or segments, 44 for scarfing the top and one side of the bloom (left side as viewed in Figure 1) are connected by brackets 43 to the support 41, and the torch elements for scarfing the bottom and right side of the bloom are joined by similar brackets to support 42.

When a scarfing operation is to be started on a billet (shown in phantom outline in Figures 1 and 2), the torch elements 44 are normally held back out of the path of the billet by supplying compressed air to the cylinders of the motors 24 to cause those motors to draw the frames 27 away from one another and from the center of the conveyor. At the same time the motor 33 on one side of the apparatus is operated to lower the support 42 and the corresponding motor 33 on the other side of the apparatus is operated to raise the support 41. The torch elements 44 are then out of the way where they cannot be struck by the end of the billet.

As soon as the end of the billet has passed the supports 41 and 42, compressed air is supplied to the motors 24 and 33 to cause them to move in the reverse direction and bring all of the torch elements 44 into position around the billet. Motion of the torch elements towards the billet is stopped by shoes 51 attached to the torch elements coming in contact with the billet. The compressed air holds the torch elements in position with the shoes against the billet with a yielding pressure such that each shoe that is against the surface of the billet yields or advances in response to any horizontal change in the relative position of the surface with respect to the center line of the conveyor or any vertical change with respect to the level of the conveyor.

In order to prevent the torch elements 44 from striking one another if the torch-positioning devices are brought together with no bloom between them or with a bloom too small for the torch elements limit stops are provided. Screws 46 threaded through lugs on the bracket arm 41 strike against abutments 47 on the bracket arm 42.

Figure 5:
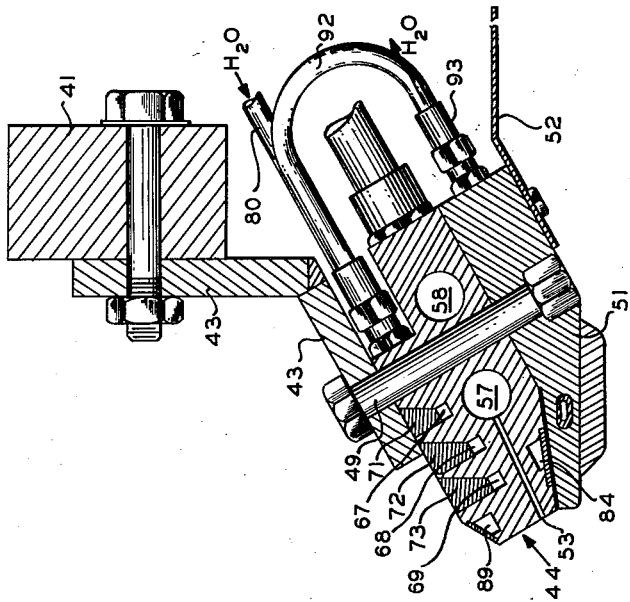
Figure 5 is a sectional view taken along line 5—5 of Fig. 1 showing the scarfing head segment, the mounting bracket and support, and the wear shoe.
Figure 6:
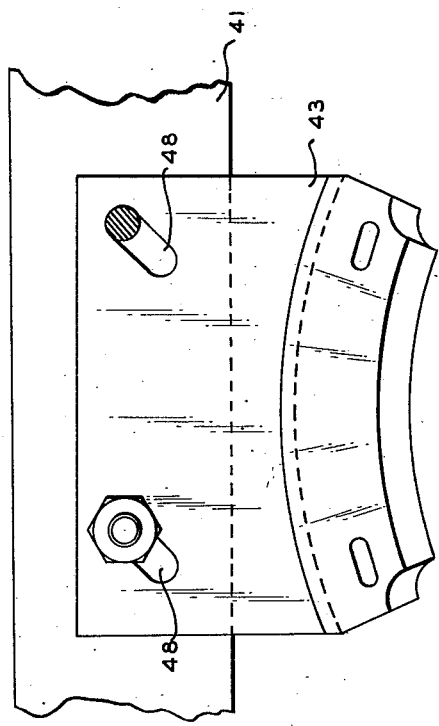
Figure 6 is a front view of the mounting bracket.
Figure 9:
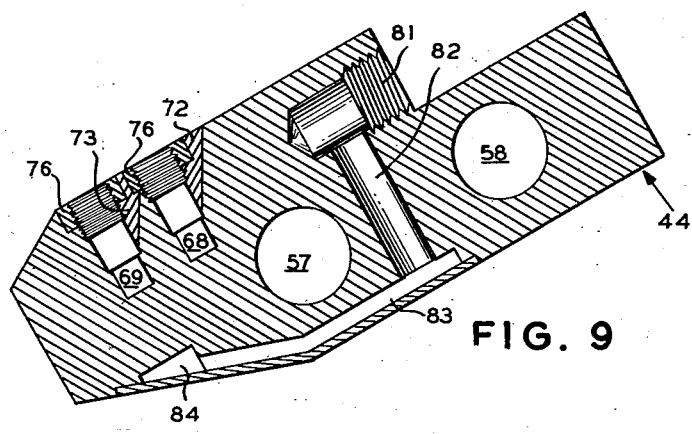
Figure 10:
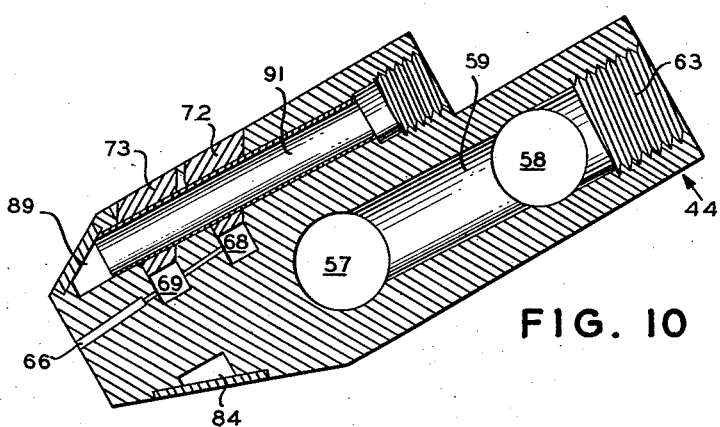
Figure 11:
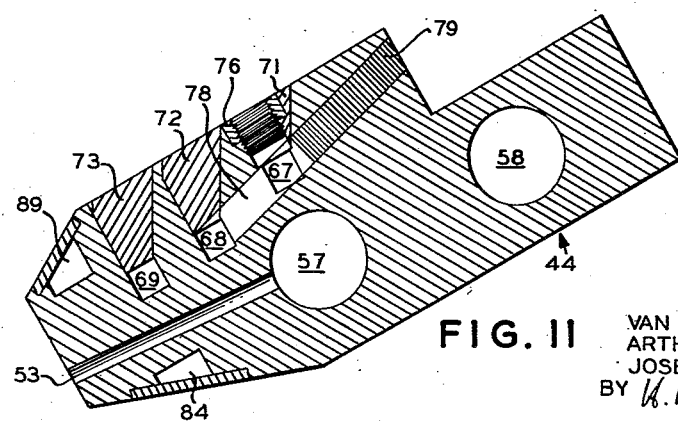
Figure 12:
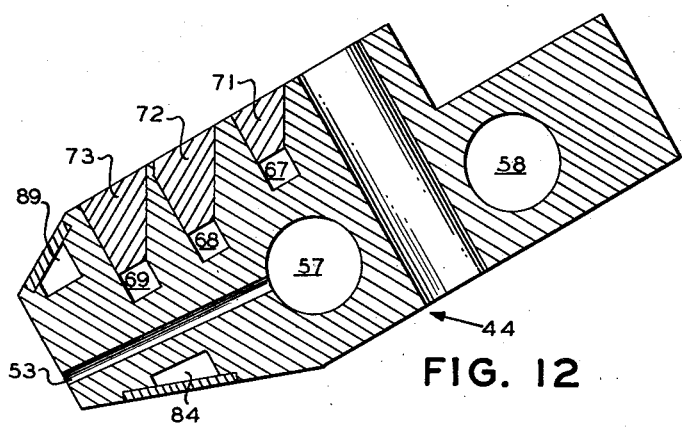
Figure 13:
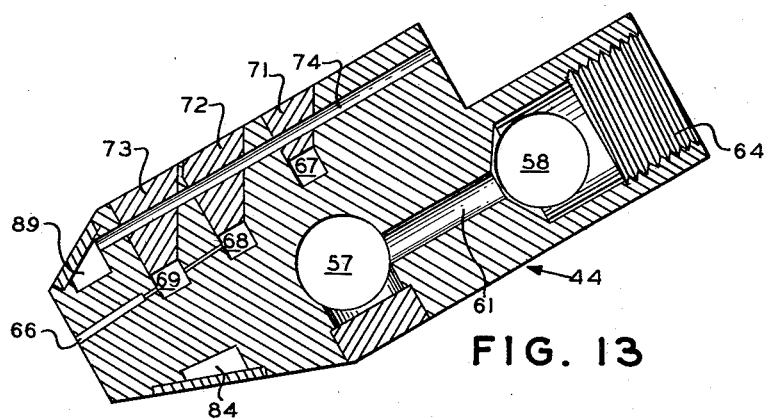
Figure 14:
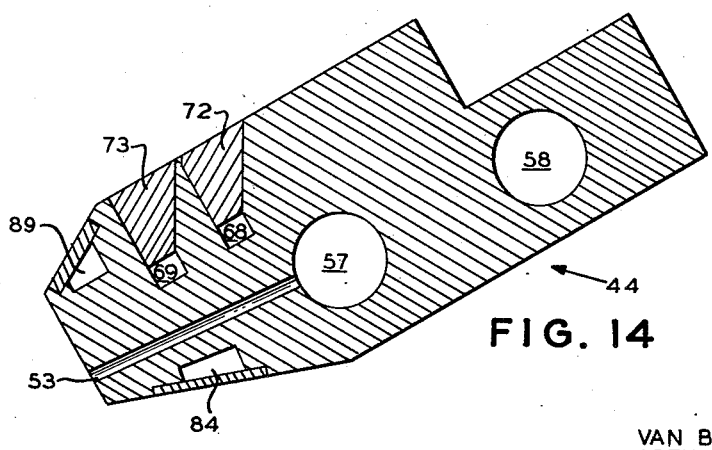
Figure 15:
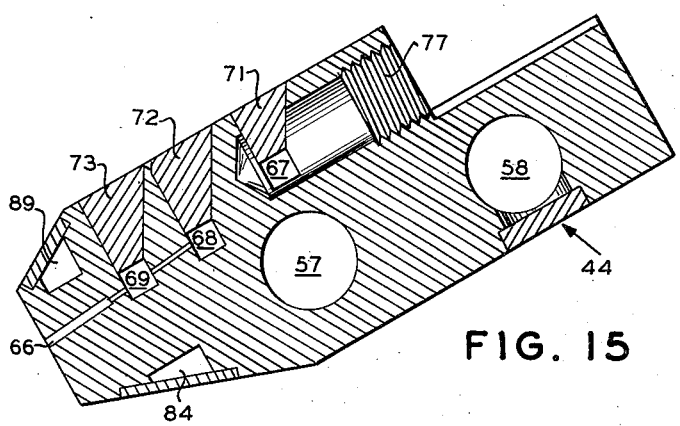
Figure 16:
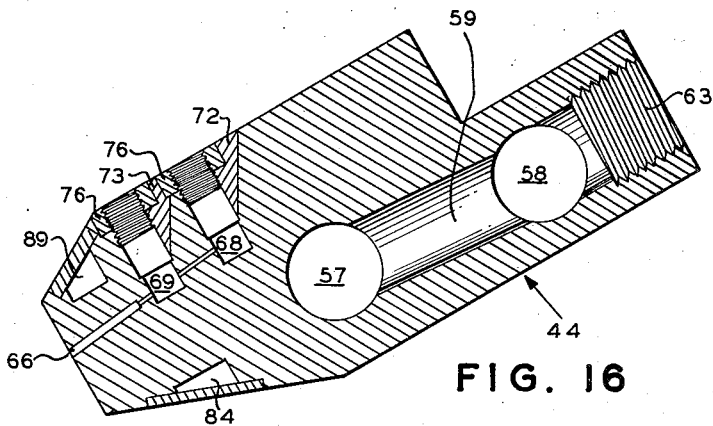
Figure 17:
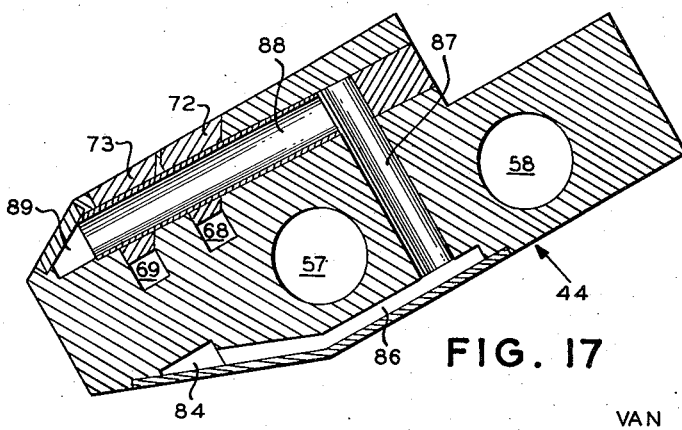

The scarfing head segments 44 are mounted on the support brackets 43, best shown in Figures 5 and 6. Each bracket may be slidably adjusted to vary the size of the area enclosed by the segments by adjustment of the position of the bracket on the bracket arm, which adjustment is permitted by the angular slots 48 through which the securing bolts pass. A portion of bracket 43 is appropriately curved to fit snugly against the outer surface of the scarfing head segment 44 and the segment is secured thereto by bolts 49. Bolts 49 not only maintain the segment 44 in a fixed position with respect to the bracket 43 but also pass through 44 and support a scarfing shoe 51, which rides on the work.

A shield 52 is mounted on the scarfing shoe 51 such that it protects the tube connections to the scarfing head segment 44 and the scarfing shoe 51.

In the particular embodiment of the invention illustrated, each scarfing head segment 44 forms an arc of slightly less than 90 degrees and scarfing oxygen orifices 53 drilled therein are spaced 3 degrees apart on radial centers. Orifices 53 are all of the same diameter; however, orifices 54, 56 situated at the extremities of each segment are of a greater diameter. Orifices 54 and 56 are also drilled at different angles than orifices 53. Orifices 54 are drilled at an angle of 2°–00′ with a radial line and are directed toward the outer edge of the segment, whereas the orifices 56 are drilled at the even greater angle, 2°–50′, with a radial line. Orifices 56 are also directed toward the outer edge of the segment. With orifices 54 and 56 drilled at such angles the scarfing action of the issuing oxygen streams of adjacent torch elements then overlap and eliminate the ridge that would otherwise remain on the billet in the region between adjacent scarfing head segments. Orifices 53, 54 and 56 extend into the interior of the scarfing head segment 44 and intersect a conduit 57 cast into the segment. A second conduit 58, also cast into the segment is posterior to conduit 57 and connected therewith by drilled passages 59 and 61 arranged at intervals along their length. This manifolding arrangement assures an even distribution of the scarfing oxygen supplied to conduits 53, 54 and 56. The conduits 57, 58 are stoppered at either end with brass plugs 62 silver brazed in place. Scarfing oxygen is admitted to conduit 58 through tapped hole 64 to which the oxygen supply tube is connected by suitable fittings. Plugs are inserted in tapped holes 63, which holes are used to gain access to passages 59 during construction.

Preheat orifices 66 are of smaller diameter than the scarfing oxygen orifices 53, but are similarly arranged along radial lines 3° apart. The line of centers of the preheat orifices are inclined to make a small angle with the surface generated by the scarfing $O_2$ jets. The preheat orifices are alternately arranged in staggered relation with the scarfing orifices 53. All of the preheat orifices are drilled on radial lines. The five conduits on the extremities of each segment 44 are arranged along radial lines only 1°–30′ apart. Three preheat gas manifolding chambers 67, 68 and 69 are formed by slots milled in the outside surface of segment 44. Inserts 71, 72, and 73 are silver brazed in position in the top of the milled slots to form the manifolding chambers. These inserts may be retained in their position for soldering by a dowel for which an appropriate hole 74 is provided. Plugs 76, inserted and silver brazed at the extremities of each channel are drilled and tapped to provide access to these manifolding chambers for the purpose of cleaning them. Threaded plugs provide closures for these access holes. Channel 67 acts as the primary intake and distribution manifold for the oxyacetylene gas mixture. Mixed gas from an appropriate supply enters manifolding chamber 67 through a port 77 which intersects chamber 67 at approximately its center. Drilled passages 78 at both ends of chamber 67 connect chamber 67 to chamber 68. Plugs 79 close the back of passages 78 above chamber 67. Preheat orifices 66 are drilled through chamber 69 and intersect chamber 68. These orifices are of very small diameter and the three stage manifolding arrangement acts to produce an even distribution of the issuing gas. The discharge end of the flame orifices are counterbored in a conventional manner.

In effect the scarfing oxygen orifices, with the exception of the special orifices at the ends of each segment, produce a cone of oxygen jets having an apex at the center line of the workpiece. The spacing of the center lines of the individual jets from one another on the line where this cone cuts the surface of the work should preferably be of the order of 0.20 inch. The heating gas orifices produce a cone of heating gas jets also having an apex at the center line of the workpiece. This cone cuts the surface of the work at substantially the same place as the cutting oxygen jet cone. In practice it has been found that the lines of intersection of these two cones with the surface of the workpiece should be within about ¼ inch of each other.

It has been found that with the segment construction described above, including the key features of the fanned out scarfing jets at the segment ends and the increased preheat density at the segment ends, round billets of a limited range of diameters can successfully be scarfed in a single pass leaving a smooth surface free of defects and ridges. By way of example, a scarfing machine according to the present invention has been used to successfully scarf round billets of from 7⅞ inches to 8⅞ inches diameter. To change billet sizes the relative positions of the two adjacent segments that are supported from a single arm are adjusted so the spacing between these segment ends is approximately equal to the spacing between segment ends of adjacent segments supported on different arms, when the burner is closed around the billet.

The scarfing head segment 44 has a water cooling system comprising an inlet 81, fed from a water-in tube 80 which connects with a cross passage 82 which in turn leads down a passage 83 formed by a plate covering a recess in the face of the segment adjacent the shoe 51. A similar passage 84 communicates with the lower end of passage 83 and carries the cooling fluid across substantially the entire extent of the segment before it intersects channel 86 which carries the liquid up the inside surface of the torch element to a drilled passage 87 communicating with drilled passage 88 on the side of the segment opposite the shoe. From this passage the water circulates along the length of the back of the segment in a conduit 89 from which it discharges from the segment thru passage 91. Discharge passage 91 is tapped to receive appropriate fittings for tube 92 which leads into the torch shoe 51 where the liquid also acts as a coolant. From the torch shoe 51 there is a discharge tube 93 which carries the cooling liquid away from the scarfing area.

We claim:

1. The method of scarfing a cylindrical workpiece which comprises substantially completely surrounding the workpiece with a plurality of arcuate scarfing burners, projecting a plurality of heating flames and main scarfing oxygen jets from said scarfing burners obliquely against the cylindrical surface of the workpiece so that the geometric projections of the heating flames and the scarfing oxygen jets on the surface of the workpiece are parallel to the axis of the workpiece, and projecting additional scarfing oxygen jets from the terminal portions of adjacent burners obliquely against the cylindrical surface of the workpiece so that the geometric projection of said additional scarfing oxygen jets on the surface of the workpiece diverge from the projection of said main oxygen jets in the same burner and converge with the projection of the additional jets from the near end of the adjacent burner, and advancing said workpiece axially with respect to said burners to scarf the entire surface of said workpiece in a single pass.

2. The method according to claim 1 in which heating flames of greater intensity are projected from the terminal portions of each scarfing burner than are projected from the remainder of each burner.

3. Apparatus for scarfing cylindrical workpieces comprising a plurality of arcuate scarfing burners, means for advancing said burners into operable position to collectively substantially completely surround the workpiece, means for projecting a plurality of heating flames from each of said arcuate scarfing burners obliquely against the surface of said workpiece, means for projecting a plurality of main scarfing oxygen jets from each of said arcuate scarfing burners obliquely against the surface of said workpiece in such direction that the geometric projections of the axes of said scarfing oxygen jets on the surface of the workpiece are parallel to the axis of the workpiece, and means for projecting additional scarfing oxygen jets from the terminal portions of each scarfing burner obliquely against the surface of the workpiece in such direction that the geometric projection of said additional scarfing oxygen jets on the surface of the workpiece diverge from the projection of said main oxygen jets in the same burner and converge with the projection of the additional jets from the near end of the adjacent burner, and means for advancing the workpiece axially with respect to said scarfing burners.

4. Apparatus according to claim 3 in which the means for producing the additional scarfing oxygen jets in each scarfing burner include scarfing oxygen orifices of larger diameter than the main scarfing oxygen orifices.

5. Apparatus for scarfing cylindrical workpieces comprising a plurality of arcuate scarfing burners, means for advancing said burners into operable position to collectively substantially completely surround the workpiece, means for projecting a plurality of heating flames from each of said arcuate scarfing burners obliquely against the surface of said workpiece in such direction that the geometric projections of the axes of the heating flames on the surface of the workpiece are parallel to the axis of the workpiece, said heating flames being in greater concentration at the terminal portions of each burner compared with the concentration of such flame over the major portion of the length of said burner, means for projecting a plurality of main scarfing oxygen jets from each of said arcuate scarfing burners obliquely against the surface of said workpiece in such direction that the geometric projections of the axes of said scarfing oxygen jets on the surface of the workpiece are parallel to the axis of the workpiece, and means for projecting additional scarfing oxygen jets from the terminal portions of each scarfing burner obliquely against the surface of the workpiece in such direction that the geometric projection of said additional scarfing oxygen jets on the surface of the workpiece diverge from the projection of said main oxygen jets in the same burner and converge with the projection of the additional jets from the near end of the adjacent burner, and means for advancing the workpiece axially with respect to said scarfing burners.

6. A scarfing burner adapted to be used with at least one other such burner to scarf arcuate surfaces which comprises an arcuate structure having an arcuate inclined face containing a plurality of radially directed scarfing oxygen orifices normal to the inclined face and equally spaced along the major portion of the length thereof and a plurality of non-radial scarfing oxygen orifices forming divergent angles with said radial scarfing orifices and with each other adjacent each end of said inclined face, radially directed heating flame orifices spaced from the scarfing oxygen orifices and inclined to make a small included angle with the arcuate surface produced by the projected axes of the scarfing oxygen orifices, said heating flame orifices being provided in greater concentration in the region of said non-radial scarfing oxygen orifices than in the region of said radial scarfing oxygen orifices, scarfing oxygen manifolding means communicating with said scarfing oxygen orifices, scarfing oxygen inlet means communicating with said scarfing oxygen manifolding means, heating gas manifolding means communicating with said heating flame orifices, and heating gas inlet means communicating with said heating gas manifolding means.

7. A scarfing burner according to claim 6 in which the non-radial scarfing oxygen orifices are of larger diameter than said radial scarfing oxygen orifices.

References Cited in the file of this patent

UNITED STATES PATENTS

| 2,058,388 | Rendleman | Oct. 20, 1936 |
| 2,215,577 | Bucknam | Sept. 24, 1940 |
| 2,252,320 | Hughey | Aug. 12, 1941 |
| 2,290,295 | Scheller | July 21, 1942 |
| 2,351,653 | Anderson | June 20, 1944 |
| 2,442,437 | Robbins et al. | June 1, 1948 |
| 2,742,960 | Smith | Apr. 24, 1956 |

FOREIGN PATENTS

| 694,191 | Germany | July 26, 1940 |